United States Patent
Gabrys et al.

(10) Patent No.: US 12,286,221 B2
(45) Date of Patent: Apr. 29, 2025

(54) TUBULAR WING STRUCTURES AND METHODS OF MANUFACTURE

(71) Applicant: The Boeing Company, Chicago, IL (US)

(72) Inventors: Jonathan Gabrys, Downington, PA (US); Megan Prucnal, Wallingford, PA (US); Kevin Michael Drayer, Media, PA (US); Daniel Stephen Kraynik, West Chester, PA (US)

(73) Assignee: The Boeing Company, Chicago, IL (US)

( * ) Notice: Subject to any disclaimer, the term of this patent is extended or adjusted under 35 U.S.C. 154(b) by 73 days.

(21) Appl. No.: 17/937,971

(22) Filed: Oct. 4, 2022

(65) Prior Publication Data

US 2024/0109643 A1 Apr. 4, 2024

(51) Int. Cl.
*B64C 3/26* (2006.01)
*B64C 3/18* (2006.01)

(52) U.S. Cl.
CPC ................ *B64C 3/185* (2013.01); *B64C 3/26* (2013.01)

(58) Field of Classification Search
CPC .............. B64C 3/185; B64C 3/26; B64C 3/28
See application file for complete search history.

(56) References Cited

U.S. PATENT DOCUMENTS

| 2,776,100 | A | * | 1/1957 | Breguet | B64C 3/26 29/446 |
| 3,519,228 | A | * | 7/1970 | Windecker | B64C 3/26 428/167 |
| 3,666,210 | A | * | 5/1972 | Look | B64C 3/56 244/218 |
| 4,565,595 | A | * | 1/1986 | Whitener | B29D 24/008 244/123.13 |
| 8,490,362 | B2 | * | 7/2013 | Kulesha | B64C 3/187 52/696 |
| 10,207,471 | B2 | * | 2/2019 | de Diego | F01D 5/147 |
| 2003/0173460 | A1 | * | 9/2003 | Chapman, Jr. | B64C 1/06 244/123.3 |
| 2019/0016436 | A1 | * | 1/2019 | Stickler | B32B 7/02 |
| 2019/0016438 | A1 | * | 1/2019 | Humfeld | B29D 99/0014 |

FOREIGN PATENT DOCUMENTS

| CA | 2716984 A1 * | 9/2009 | .......... B29C 33/301 |
| CA | 3124206 A1 * | 1/2022 | .......... B29C 70/342 |
| GB | 2604141 A  * | 8/2022 | .............. B64C 3/18 |

* cited by examiner

*Primary Examiner* — Assres H Woldemaryam
(74) *Attorney, Agent, or Firm* — Yee & Associates, P.C.

(57) ABSTRACT

A wing structure having a unitary body formed by a plurality of tubular sections that are arranged side-by-side and configured such that adjacent internal walls of the tubular sections create internal spar structures that substantially reduce or eliminate the need for non-integral spars, or for fasteners to attach conventional spars and ribs into the wing skins. The unitized structure formed by the plurality of tubular sections can be further overwrapped with a composite material to provide additional strength to the wing structure.

22 Claims, 4 Drawing Sheets

TUBULAR WING STRUCTURES AND METHODS OF MANUFACTURE

FIELD

The disclosure generally relates to structures that incorporate a plurality of tubular structures to form a unitary body and provide structure and shape for an aircraft wing and methods of manufacture.

BACKGROUND

The wings of an aircraft develop the major portion of the lift of the aircraft. The particular design of a wing depends on many factors, such as the size, weight, speed, rate of climb, and use of the aircraft. Wing construction in most modern aircraft typically consists of individual components such as spars, ribs, stringers, and skin sections joined in combination to provide an integrated load carrying body, which is capable of reacting to aerodynamic forces encountered during flight. Some recent aircraft have used composite wing skins that are attached to metal structural spars and ribs with metal fasteners. The metal fasteners to attach wing skins to individual spars add undesired weight to the aircraft and are subject to corrosion. Additionally, the assembly of individual components using mechanical fasteners is more complicated, requiring the use of fixtures and tools for aligning mechanically joints together. There is also a risk of creating potential failure points in the structure at these joints. Overall, manufacturing integrated load bearing structures is expensive, time consuming, and labor intensive.

SUMMARY

In accordance with one or more examples, the present disclosure provides a wing structure comprising a unitary body formed by a plurality of tubular sections. In some examples the plurality of tubular sections comprises at least three tubular sections that include a leading edge tubular section having an aft surface extending in a spanwise direction defining a forward portion of a front wing spar; an aft tubular section having a forward surface extending in a spanwise direction defining an aft portion of a mid-wing spar; and an intermediate tubular section having a forward surface extending in a spanwise direction defining an aft portion of the front wing spar and an aft surface defining a forward portion of the mid-wing spar.

In accordance with one or more examples, the present disclosure provides a method for manufacturing a wing structure for an aircraft. The method comprises:

printing, via additive manufacturing, at least three (3) three-dimensional tubular sections that include a leading edge tubular section having an aft surface extending in a spanwise direction, an aft tubular section having a forward surface extending in a spanwise direction, and an intermediate tubular section having an aft surface and a forward surface extending in a spanwise direction; and connecting the at least three tubular sections to form a unitary body such that the aft surface of the leading edge tubular section defines a forward portion of a front wing spar, the forward surface of the aft tubular section defines an aft portion of a mid-wing spar, the forward surface of the intermediate tubular section defines an aft portion of the front wing spar, and the aft surface of the intermediate tubular section defines a forward portion of the mid-wing spar.

The features, functions, and advantages that have been discussed can be achieved independently in various embodiments or may be combined in yet other embodiments further details of which can be seen with reference to the following description and drawings.

DRAWINGS

The various advantages of the embodiments of the present disclosure will become apparent to one skilled in the art by reading the following specification and appended claims, and by referencing the following drawings, in which:

DESCRIPTION

Figure 1:
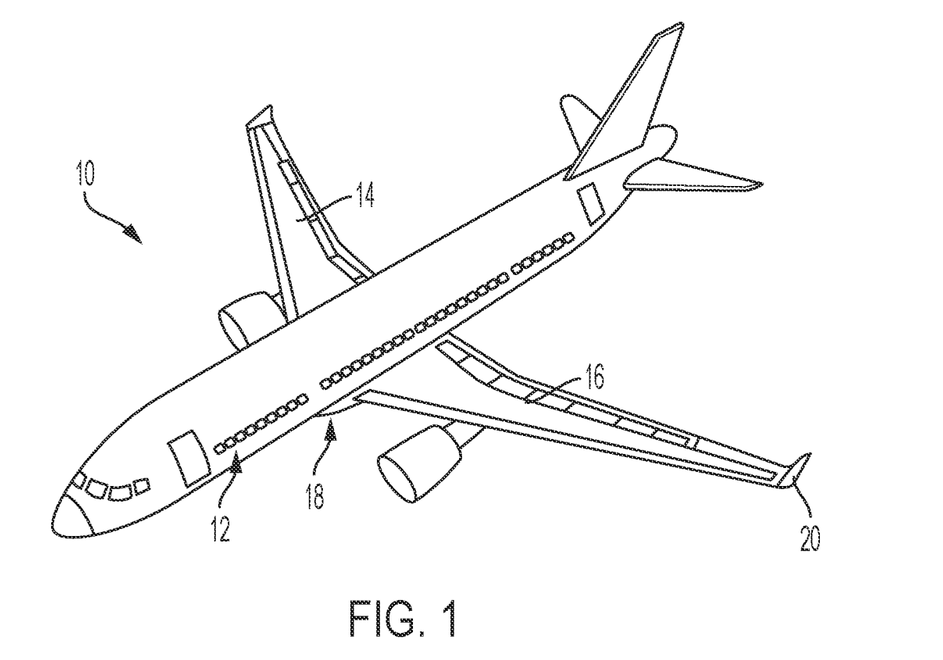
FIG. 1 is a schematic of an example aircraft comprising a wing section according to the present disclosure.
Figure 2:
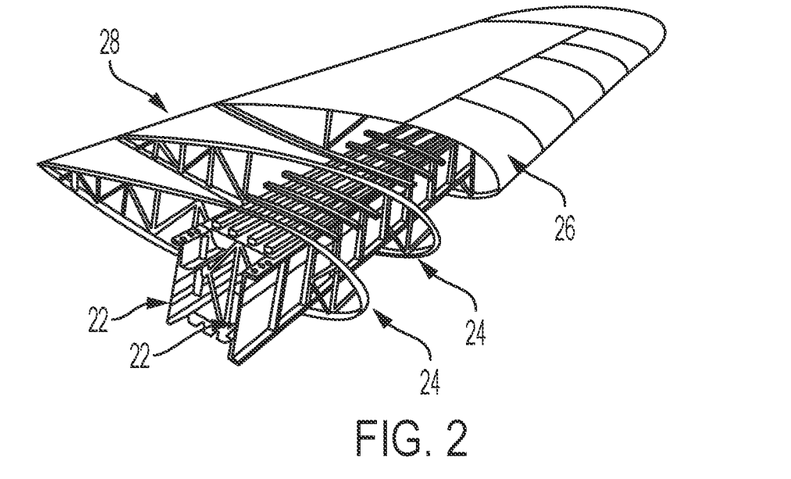
FIG. 2 schematically illustrates a conventional aircraft wing.

Referring to the drawings, FIG. 1 is a perspective illustration of a typical aircraft 10 that includes a fuselage 12, and wings 14 and 16 attached to the fuselage 12. Each of the wings 14 and 16 has a wing root 18 and a wing tip 20. The construction of a conventional aircraft wing is illustrated in FIG. 2. In its simplest form, a conventional wing is a framework made up of spars 22 and ribs 24 covered with metal. Spars 22 are the main structural members of the wing. They extend from the fuselage 12 to the wing tip 20. All the load carried by the wings 14, 16 is taken up by the spars 22. The spars 22 are designed to have great bending strength. Ribs 24 give the wing section its shape, and they transmit the air load from the wing covering to the spars 22. Ribs 24 extend from the leading edge 26 to the trailing edge 28 of the wing.

Figure 3:
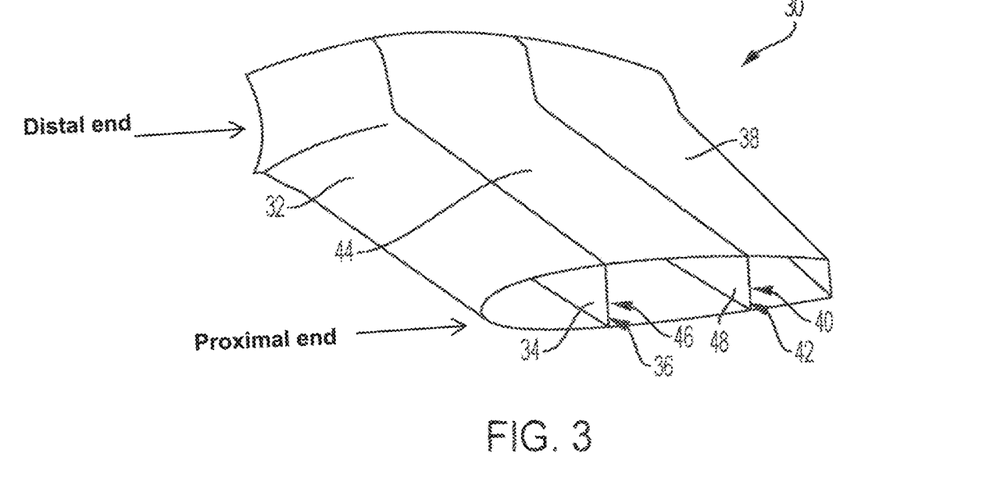
FIG. 3 schematically illustrates an example of the wing structure of the present disclosure.

In accordance with one or more examples of the present disclosure, the wing structure 30 of the present disclosure comprises a unitary body formed by a plurality of tubular sections where a plurality can include 2 or more tubular sections. FIG. 3 illustrates an example of the wing structure of the present disclosure wherein a plurality of three tubular sections (32, 44, 38) are arranged side-by-side and configured such that adjacent internal walls of the tubes (formed by aft surface 34 of leading edge tubular section 32 and forward surface 46 of intermediate tubular section 44, and by aft surface 48 of intermediate tubular section 44 and forward surface 40 of aft tubular section 38) essentially create spar structures (36, 42) that provide the required structural capability for wing loads and replace traditionally-designed aircraft spar support structures. The configuration of the plurality of tubular sections of the present disclosure is used to build up the shape of the wing of the aircraft as a large, unitized structure wherein the adjoining walls of the large-scale tubes create internal spar structures that substantially reduce or eliminate the need for non-integral spars, or for fasteners to attach conventional spars and ribs into the wing skins. The unitized structure formed by the plurality of tubular sections can be further overwrapped with a composite material to provide additional strength to the wing structure.

Figure 4:
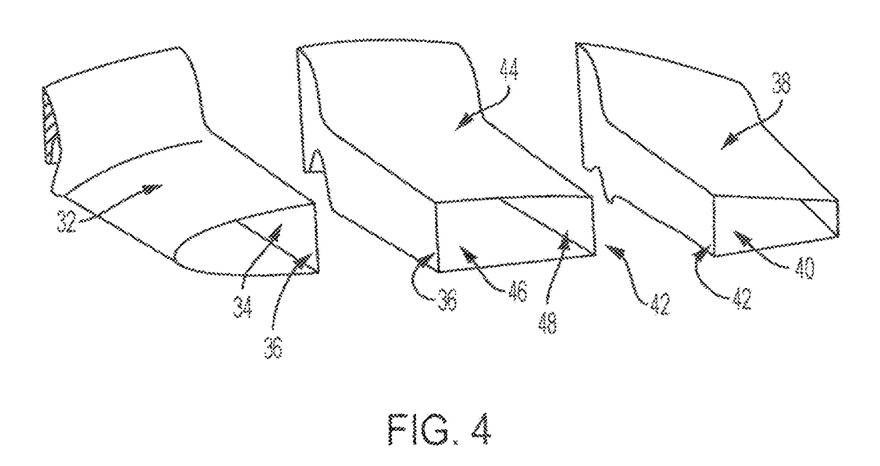
FIG. 4 schematically illustrates tubular sections of the present disclosure.
Figure 5:
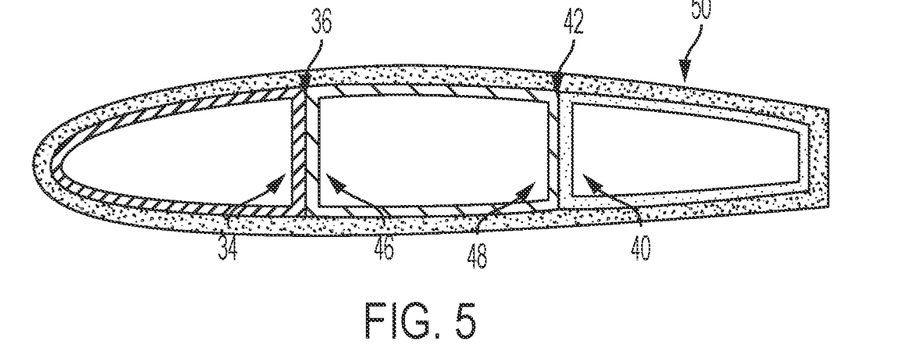
FIG. 5 is a schematic illustration of a cross-section view of the wing structure of the present disclosure.

In some examples, the plurality of tubular sections is at least three tubular sections. As illustrated in FIGS. 3 and 4, a plurality of at least three tubular sections can include: (1) a leading edge tubular section 32 having an aft surface 34 extending in a spanwise direction defining a forward portion of a front wing spar 36, (2) an aft tubular section 38 having a forward surface 40 extending in a spanwise direction defining an aft portion of a mid-wing spar 42, and (3) an intermediate tubular section 44 having a forward surface 46 extending in a spanwise direction defining an aft portion of the front wing spar 36 and an aft surface 48 defining a forward portion of the mid-wing spar 42. Referring to FIG. 5, the wing structure of the present disclosure can further include an overwrap layer 50 that encapsulates and surrounds the unitary body formed by the plurality of tubular sections (32, 44, 38). The overwrap layer 50 is on the exterior surfaces of the at least three tubular sections to form an outer shell. While some examples have a plurality of tubular sections that comprise at least three tubular sections, other examples may comprise two tubular sections.

The term "unitary body" as used herein refers to a one piece body that is integrally formed as a single unified structure. In some examples wherein the plurality of tubular sections is at least three tubular sections, the tubular sections that form the unitary body of the wing structure are positioned adjacent to one another such that adjoining wall sections are configured to be attached to an adjacent tubular section, which when joined, form a forward spar or spar-like structure such as front wing spar 36 illustrated in FIGS. 3, 4, and 5 and at least one additional spar or spar-like structure, such as a mid-wing spar or spar-like structure 42 illustrated in FIGS. 3, 4, and 5. Multiple intersecting or adjoining tubular wall sections will form multiple spar or spar-like structures when the tubes are joined. The terms "spar", "spar structure", and "spar-like structure" are used interchangeably herein.

Figure 6:
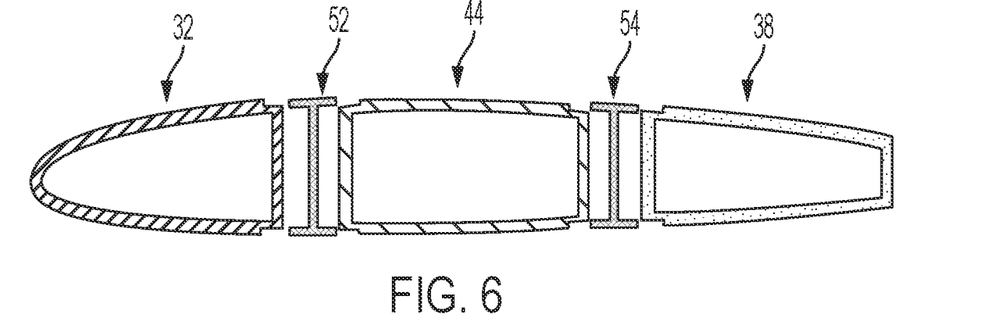
FIG. 6 is a schematic illustration of an exploded cross-section view of a wing structure of the present disclosure.
Figure 7:
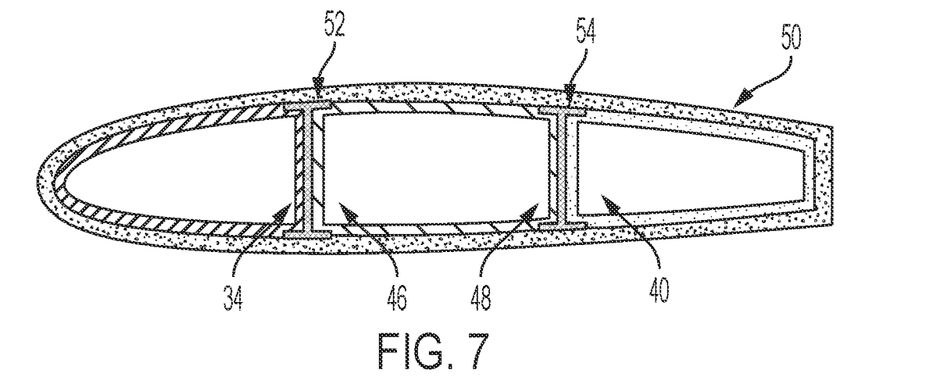
FIG. 7 is a schematic illustration of a cross-section view of a wing structure of the present disclosure.

In some examples, the plurality of tubes is not attached to a separate non-integral traditional spar as described herein and illustrated, for example, in FIGS. 1-5. In other examples, at least one separate non-integral spar may be located in between adjoining wall sections of the adjacent tubular sections. For example, separate non-integral spars 52 and 54 may be located in between adjoining wall sections of the adjacent tubular sections (32, 44, 38), which are arranged side-by-side as shown in FIGS. 6 and 7. The separate non-integral spars 52 and 54 may also be used for geometrically locating the tubes for overwrapping, bonding, or fastening as illustrated in FIG. 7.

Figure 8:
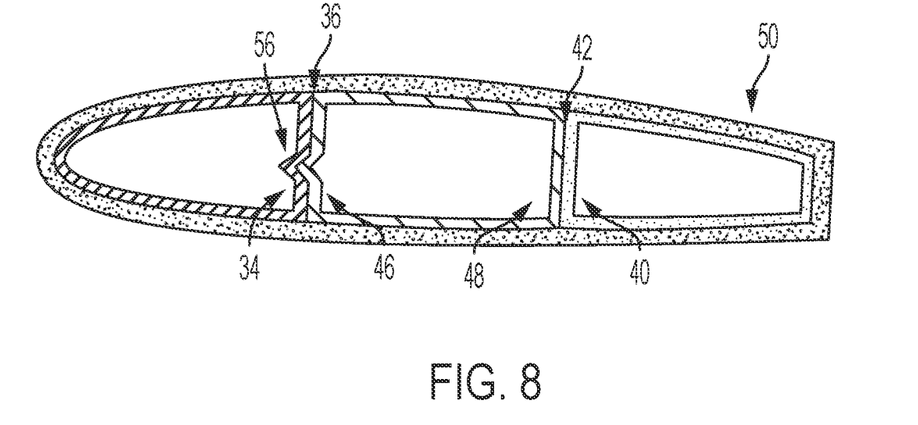
FIG. 8 is a schematic illustration of a cross-section view of a wing structure of the present disclosure.

The plurality of tubes may be fastened, joined, attached, connected, by any suitable mechanical fastening devices, parts, and fasteners commonly used in the aerospace industry, or by bonding. For example, when the plurality of tubular sections is joined, the aft surface 34 of the leading edge tubular section 32 and the forward surface 46 of the intermediate tubular section 44 are connected via a first connection, and the forward surface 40 of the aft tubular section 38 and the aft surface 48 of the intermediate tubular section 44 are connected via a second connection. The first connection and the second connection, respectively, may comprise geometrically locking the tubes together or a fitting connection such as a tongue and groove connection, a mechanical connection via mechanical fasteners, such as bolts and collars, bolts and nuts, or screws, or a bonding connection such as an adhesive bond connection. FIG. 8 illustrates a geometrical locking connection 56. The first connection and second connection may both be geometrical locking connections, may both be fitting connections, may both be mechanical connections, may both be bonding connections, or may be any combination of a geometrical locking connection, a fitting connection, a mechanical connection, and a bonding connection.

The term "tubular sections" is used interchangeably with "tubular members" "tubular structures", "tubular bodies", "tubular elements", and "tubes". The tubular sections are elongated hollow tubes and can have a rectangular, oval, elliptical, circular, or complex cross section. The tubular sections can be formed to have the shape of the wing outer mold line (OML). The tubular sections can be open on both ends, closed on both ends, or open on one end and closed on the other end. For example, in one aspect, a distal end of one or more of the plurality of tubular sections, such as at least two tubular sections, or at least three tubular sections, can be open. In another aspect, a distal end of one or more of the leading edge tubular section 32, the aft tubular section 38, and the intermediate tubular section 44 can be open. In yet another aspect, a distal end, and a proximal end of one or more of the leading edge tubular section 32, the aft tubular section 38, and the intermediate tubular section 44 can be open.

The overwrap layer 50 and the plurality of tubular sections (32, 44, 38) can comprise a composite material. The term "composite material" refers to a material made of two or more constituent materials with different physical or chemical properties. In general, composite materials include reinforcing materials suspended in a matrix material that stabilizes the reinforcing material and bonds it to adjacent reinforcing materials, such as, for example, reinforcing fibers embedded in a polymer resin matrix.

The overwrap layer and tubular sections can include a filament wound composite material or a composite material fabricated by a hand lay-up process. Filament wound composite materials are used in aircraft structures due to the ability to tailor structural properties to expected loads in different directions. The filament wound composite material can include reinforcing fibers selected from the group consisting of carbon fibers, fiberglass, and polymer fibers. The composite material can be oriented in several directions depending on the use of the structure including, but not limited to, 0, ±45, and 90 degrees. If a structural element is to carry a substantial load in only one direction, then the majority of the fibers can be oriented in that direction. This characteristic of filament wound composite materials provides for high strength-to-weight ratios and for the potential for significant weight reduction in the overall structural design. To maximize strength in more than one direction, multiple layers, or plies, having fibers aligned in different directions with respect to one another can be combined in the desired arrangement to provide combined strength along the principal axis as well as off-axis directions. The fibers can be oriented at different angles, such as 0, ±45, and 90 degrees to obtain the desired properties of tensile, compression, and shear strength in desired directions. In some examples, the composite material is oriented first in the hoop/chord direction to ensure good structural connectivity between the adjacent tubular sections. Wrapping in the hoop direction builds the structure from the bottom up, thereby providing stiffness to the bottom portion of the structural element, particularly as printing continues upward in a 3D additive manufacturing process. Hoop wrapping can be used as the first ply for each tube of the plurality of tubular sections and/or for the first ply of the overwrap layer.

In some examples, the reinforcing fibers such as carbon fibers, fiberglass, and polymer fibers are in the form of a sheet or fabric, that includes uni-directional, non-crimp, woven, and braid formats. Unidirectional tape can be pre-impregnated with a matrix material and is customarily provided on large rolls which can then be placed in a mold by hand or by robotic tape-laying machines. Similarly, bidirectional fabrics, having fibers running at 0 and 90 degrees, or unidirectional fabrics having fibers running in one direction can also be provided on large rolls pre-impregnated with a matrix material. A filament wound construction technique can be employed wherein individual filaments are wound around plugs or mandrels, which duplicate the inner surface of the structure, to form the desired structural shapes of the tubular sections.

Various fiber and matrix combinations can be used to form the composite material which comprise the tubular sections of the wing structure of the present disclosure. The functional characteristics of both the fiber and the matrix should be considered in choosing the appropriate fiber and matrix combination for the composite material used in forming the wing structure of the present disclosure. The fiber and matrix combination for the composite material may also be selected and tailored based on the location within the wing structure and the load to which it is subjected. In general, the fibers function primarily to carry stresses generated in the composite material while the matrix functions to hold the fibers together, distribute the load between the fibers, and protect the fibers from the environment. Suitable composite materials include but are not limited to, graphite, aramid, boron, or glass fibers embedded in an epoxy resin matrix or thermoplastic matrix, such as a nylon matrix. Other examples include but are not limited to fiberglass embedded in an epoxy resin matrix or a thermoplastic matrix, such as a nylon matrix; boron fibers in combination with an epoxy resin matrix or a thermoplastic matrix, such as a nylon matrix; aramid fibers, in combination with an epoxy resin matrix, or a thermoplastic matrix, such as a nylon matrix; and graphite fibers in combination with an epoxy resin matrix or thermoplastic matrix such as a nylon matrix. In some examples, the composite material is a chopped carbon fiber in nylon matrix. Metallic fibers can also be used in addition to a variety of other polymer or metallic based matrix materials.

The composite materials can be molded and cured at room conditions or at elevated temperature and pressure for improved strength and quality.

In one or more examples, the tubular sections can include metal materials, or a combination of composite materials and metal materials. Suitable metal materials for the tubular sections include, but are not limited to aluminum, steel, titanium, and their alloys. Aluminum alloys are widely used in aircraft construction due to their high strength-to-weight ratio and corrosion resistance. Steel alloys also have high strength and high tensile steels are able to withstand high levels of stress. Steel is also easily made into tubes. Stainless steel is high in corrosion resistance. Titanium is used in the aerospace industry including in the formation of wing structures due to its high strength-to-weight ratio and reliability under large numbers of cycles and extreme temperatures. Suitable forms of titanium include, but are not limited to, titanium bars, titanium tubes, titanium sheets and titanium powder, such as for 3D additive manufacturing.

The material of the plurality of the tubular sections and the overwrap material can be the same or different. For example, one or more of the tubular sections can be a composite material and the overwrap can comprise the same or a different composite material. In another example, one or more of the tubular sections can comprise a metal tube and the overwrap can comprise a composite material. In yet another example, at least one of the tubular sections can comprise a composite material that is the same as the overwrap composite material, at least one of the tubular sections can comprise a composite material that is different from the overwrap composite material, and at least one of the tubular sections can comprise a metal.

The wing structure of the present disclosure can be made by various methods, including but not limited to, fabricating via machined or extruded metals, building up from formed sheet metal, and via additive manufacturing, also known as 3D printing. In some examples, additive 3D composite manufacturing of the wing structure of the present disclosure allows for tailored design of more efficient structures having the desired strength-to-weight ratio and structural and functional features. Some advantages of additive 3D composite manufacturing methods of the present disclosure are that it allows for orienting the composite fibers in the required direction to achieve optimal strength-to-weight ratio for internal structural members and it also allows for production of a large unitary structure that is more weight and cost efficient. Suitable additive 3D composite manufacturing methods include, but are not limited to, Carbon Fiber Reinforced Printing (CFRP), which may be Chopped Fiber Composite Printing or Continuous Fiber Composite Printing, Fused Deposition Modeling (FDM), Selective Laser Sintering (SLS), Direct Energy Deposition (DED) and Stereolithography (SLA).

An exemplary 3D printing method involves forming, via additive manufacturing, a plurality of three-dimensional tubular sections, which may include a leading edge tubular section 32 having an aft surface 34 extending in a spanwise direction, an aft tubular section 38 having a forward surface 40 extending in a spanwise direction, and an intermediate tubular section 44 having an aft surface 48 and a forward surface 46 extending in a spanwise direction; and connecting the plurality of tubular sections to form a unitary body such that the aft surface 34 of the leading edge tubular section 32 defines a forward portion of a front wing spar 36, the forward surface 40 of the aft tubular section 38 defines an aft portion of a mid-wing spar 42, the forward surface 46 of the intermediate tubular section 44 defines an aft portion of the front wing spar 36, and the aft surface 48 of the intermediate tubular section 44 defines a forward portion of the mid-wing spar 42.

Connecting the plurality of tubular sections comprises connecting, via a first connection, the aft surface 34 of the leading edge tubular section 32 and the forward surface of the intermediate tubular section, and connecting, via a second connection, the forward surface 40 of the aft tubular section 38 and the aft surface 48 of the intermediate tubular section 44. In some examples, the plurality of tubes is not attached to a separate non-integral traditional spar as described herein and illustrated, for example, in FIGS. 1-5. In other examples, the method involves inserting at least one separate non-integral spars 52 and 54 in between adjoining wall sections of the adjacent tubular sections prior to connecting the plurality of tubular sections. For example, as shown in FIGS. 6 and 7, non-integral spars 52 and 54 are inserted between adjacent walls of tubular sections (32, 44, 38), which are arranged side-by-side.

Connecting includes, but is not limited to fastening, joining, attaching, adjoining, etc., by any suitable mechanical fastening devices, parts, and fasteners commonly used in the aerospace industry, or by bonding. For example, when the plurality of tubular sections is joined, the aft surface 34 of the leading edge tubular section 32 and the forward surface of the intermediate tubular section are connected via a first connection, and the forward surface 40 of the aft tubular section 38 and the aft surface 48 of the intermediate tubular section 44 are connected via a second connection. The first connection and the second connection, respectively, may comprise geometrically locking the tubes together or a fitting connection such as a tongue and groove connection, a mechanical connection such as bolts and collars, bolts and nuts, or screws, or a bonding connection such as an adhesive bond connection. The first connection and second connection may both be geometrical locking connections, may both be fitting connections, may both be mechanical connections, may both be bonding connections, or may be any combination of a fitting connection, mechanical connection, and a bonding connection.

In the method of the present disclosure, the tubular sections comprise a composite material, a metal material, or a combination thereof. The metal material includes, but is not limited to, aluminum, steel, and titanium. The method can further include forming an overwrap layer on the exterior surfaces of the plurality of tubular sections to form an outer shell.

The tubular sections and the overwrap layer can individually or both comprise a composite material. The composite material can be a filament wound composite material or fabricated by a hand lay-up process. The composite material can include reinforcing fibers selected from the group consisting of carbon fibers, fiberglass, and polymer fibers.

Additional Notes and Examples

Further, the disclosure comprises additional notes and examples as detailed in the following clauses set forth below.

Clause 1. A wing structure, comprising: a unitary body formed by at least three tubular sections that include a leading edge tubular section having an aft surface extending in a spanwise direction defining a forward portion of a front wing spar, an aft tubular section having a forward surface extending in a spanwise direction defining an aft portion of a mid-wing spar, and an intermediate tubular section having a forward surface extending in a spanwise direction defining an aft portion of the front wing spar and an aft surface defining a forward portion of the mid-wing spar.

Clause 2. The wing structure of clause 1, wherein the at least three tubular sections comprise a composite material, a metal, or a combination thereof.

Clause 3. The wing structure of clause 1 or 2, wherein the at least three tubular sections comprise a filament wound composite material or a composite material fabricated by a hand lay-up process.

Clause 4. The wing structure of any one of clauses 1-3, wherein the filament wound composite material comprises reinforcing fibers selected from the group consisting of carbon fibers, fiberglass, and polymer fibers.

Clause 5. The wing structure of any one of clauses 1-4, wherein the at least three tubular sections are not attached to a separate non-integral spar structure.

Clause 6. The wing structure of any one of clauses 1-4, further comprising a separate non-integral spar structure located between the tubular sections.

Clause 7. The wing structure of any one of clauses 1-6, wherein the at least three tubular sections comprise a metal material selected from the group consisting of aluminum, steel, and titanium.

Clause 8. The wing structure of any one of clauses 1-6, wherein: the aft surface of the leading edge tubular section and the forward surface of the intermediate tubular section are connected via a first connection, and the forward surface of the aft tubular section and the aft surface of the intermediate tubular section are connected via a second connection.

Clause 9. The wing structure of clause 8, wherein the first connection and the second connection respectively comprise a geometrically locking connection, a fitting connection, a mechanical connection, and an adhesive connection.

Clause 10. The wing structure of clause 9, wherein the first connection and the second connection respectively comprise an adhesive bond connection.

Clause 11. The wing structure of clause 10, further comprising an overwrap layer on exterior surfaces of the at least three tubular sections to form an outer shell.

Clause 12. The wing structure of clause 11, wherein the overwrap layer comprises a composite material.

Clause 13. The wing structure of clause 11 or 12, wherein the overwrap layer comprises a filament wound composite material or a composite material fabricated by a hand lay-up process.

Clause 14. The wing structure of clause 9, wherein the overlap layer comprises a filament wound composite material, the filament wound composite material comprising reinforcing fibers selected from the group consisting of carbon fibers, fiberglass, and polymer fibers.

Clause 15. The wing structure of any one of clauses 12-14, wherein the composite material is oriented first in a hoop/chord wise direction.

Clause 16. The wing structure of any one of clauses 1-15, wherein a distal end of the at least three tubular sections is open.

Clause 17. The wing structure of any one of clauses 1-15, wherein a distal end of one or more of the leading edge tubular section, the aft tubular section, and the intermediate tubular section is open.

Clause 18. The wing structure of any one of clauses 1-15, wherein a distal end and a proximal end of one or more of the leading edge tubular section, the aft tubular section, and the intermediate tubular section is open.

Clause 19. The wing structure of any one of clauses 1-15, wherein a distal end and a proximal end of one or more of the leading edge tubular section, the aft tubular section, and the intermediate tubular section is closed.

Clause 20. A method for manufacturing a wing structure, the method comprising: forming, via additive manufacturing, at least three tubular sections that include a leading edge tubular section having an aft surface extending in a spanwise direction, an aft tubular section having a forward surface extending in a spanwise direction, and an intermediate tubular section having an aft surface and a forward surface extending in a spanwise direction; and connecting the at least three tubular sections to form a unitary body such that the aft surface of the leading edge tubular section defines a forward portion of a front wing spar, the forward surface of the aft tubular section defines an aft portion of a mid-wing spar, the forward surface of the intermediate tubular section defines an aft portion of the front wing spar, and the aft surface of the intermediate tubular section defines a forward portion of the mid-wing spar.

Clause 21. The method of clause 20, wherein connecting the at least three tubular sections comprises: connecting, via a first bond connection, the aft surface of the leading edge tubular section and the forward surface of the intermediate tubular section, and connecting, via a second bond connection, the forward surface of the aft tubular section and the aft surface of the intermediate tubular section.

Clause 22. The method of clause 20 or 21, wherein the first bond connection and the second bond connection respectively comprise an adhesive bond connection.

Clause 23. The method of clause any one of clauses 20-22, wherein the at least three tubular sections comprise a composite material, a metal material, or a combination thereof.

Clause 24. The method of clause 23, wherein the at least three tubular sections comprise a metal material selected from the group consisting of aluminum, steel, and titanium.

Clause 25. The method of clause 24, wherein the at least three tubular sections comprise a filament wound composite material or a composite material fabricated by a hand lay-up process.

Clause 26. The method of clause 25, wherein the composite material is a filament wound material, wherein said filament wound composite material comprises reinforcing fibers selected from the group consisting of carbon fibers, fiberglass, and polymer fibers.

Clause 27. The method of any one of clauses 20-26, wherein the at least three tubular sections are not attached to a separate non-integral spar structure.

Clause 28. The method of any one of clauses 20-26, further comprising inserting a separate non-integral spar structure between the tubular sections.

Clause 29. The method of any one of clauses 20-28, further comprising forming an overwrap layer on exterior surfaces of the at least three tubular sections to form an outer shell.

Clause 30. The method of clause 29, wherein the overwrap layer comprises a composite material.

Clause 31. The method of clause 31, wherein the composite material comprises a filament wound composite material or a composite material fabricated by a hand lay-up process.

Clause 32. The method of clause 31, wherein the composite material is a filament wound material, wherein said filament wound composite material comprises reinforcing fibers selected from the group consisting of carbon fibers, fiberglass, and polymer fibers.

Clause 33. The method of any one of clauses 30-32, wherein the composite material is oriented first in a hoop/chord wise direction.

Clause 34. The method of any one of claims 20-33, wherein forming the at least three tubular sections comprises forming an open distal end of one or more of the leading edge tubular section, the aft tubular section, and the intermediate tubular section.

Clause 35. The method of any one of clauses 20-33, wherein forming the at least three tubular sections comprises forming an open distal end and an open proximal end of one or more of the leading edge tubular section, the aft tubular section, and the intermediate tubular section.

Clause 36. The method of any one of clause 20-33, wherein forming the at least three tubular sections comprises forming a closed distal end and a closed proximal end of one or more of the leading edge tubular section, the aft tubular section, and the intermediate tubular section.

The terms "coupled," "attached," or "connected" can be used herein to refer to any type of relationship, direct or indirect, between the components in question, and can apply to electrical, mechanical, fluid, optical, electromagnetic, electromechanical or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action can occur, either in a direct or indirect manner.

Those skilled in the art will appreciate from the foregoing description that the broad techniques of the embodiments of the present disclosure can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A wing structure, comprising:
   a unitary body formed by at least three adjacent tubular sections arranged side-by-side, wherein the at least three tubular sections comprise:
      a leading edge tubular section having an aft surface extending in a spanwise direction defining a forward portion of a front wing spar;
      an aft tubular section having a forward surface extending in a spanwise direction defining an aft portion of a mid-wing spar; and
      an intermediate tubular section having a forward surface extending in a spanwise direction defining an aft portion of the front wing spar and an aft surface defining a forward portion of the mid-wing spar, the aft surface of the leading edge tubular section abutting and joined to the forward surface of the intermediate tubular section forming the forward wing spar, the forward surface of the aft tubular section abutting and adjoined to the aft surface of the intermediate tubular section forming the mid-wing spar;
   wherein the unitary body is a one-piece body that is integrally formed as a single unified structure; and
   wherein the at least three tubular sections are not attached to a separate non-integral spar structure.

2. The wing structure of claim 1, wherein the at least three tubular sections comprise a composite material, a metal, or a combination thereof.

3. The wing structure of claim 1, wherein the at least three tubular sections comprise a filament wound composite material or a composite material fabricated by a hand lay-up process, wherein said composite material comprises reinforcing fibers selected from the group consisting of carbon fibers, fiberglass, and polymer fibers.

4. The wing structure of claim 1, wherein the at least three tubular sections comprise a metal material selected from the group consisting of aluminum, steel, and titanium.

5. The wing structure of claim 1, wherein:
   the aft surface of the leading edge tubular section and the forward surface of the intermediate tubular section are connected via a first connection, and
   the forward surface of the aft tubular section and the aft surface of the intermediate tubular section are connected via a second connection.

6. The wing structure of claim 5, wherein the first connection and the second connection respectively comprise one or more of a geometrical locking connection, a fitting connection, a mechanical connection, and a bonding connection.

7. The wing structure of claim 1, further comprising an overwrap layer on exterior surfaces of the at least three tubular sections to form an outer shell that encapsulates and surrounds the unitary body formed by the at least three tubular sections.

8. The wing structure of claim 7, wherein the overwrap layer comprises a composite material.

9. The wing structure of claim 7, wherein the overwrap layer comprises a filament wound composite material or a composite material fabricated by a hand lay-up process.

10. The wing structure of claim 9, wherein the overwrap layer comprises a filament wound composite material, and wherein said filament wound composite material comprises reinforcing fibers selected from the group consisting of carbon fibers, fiberglass, and polymer fibers and the composite material is oriented first in a hoop/chord wise direction.

11. The wing structure of claim 5, wherein the at least three tubular sections comprise a metal material selected from the group consisting of aluminum, steel, and titanium.

12. The wing structure of claim 1, wherein a distal end of the at least three tubular sections is open.

13. The wing structure of claim 1, wherein a distal end of one or more of the leading edge tubular section, the aft tubular section, and the intermediate tubular section is open.

14. The wing structure of claim 1, wherein a distal end and a proximal end of one or more of the leading edge tubular section, the aft tubular section, and the intermediate tubular section is open.

15. The wing structure of claim 1, wherein a distal end and a proximal end of one or more of the leading edge tubular section, the aft tubular section, and the intermediate tubular section is closed.

16. A method for manufacturing a wing structure for an aircraft, the method comprising:

forming at least three, three-dimensional adjacent tubular sections arranged side-by-side, wherein the at least three tubular sections comprise a leading edge tubular section having an aft surface extending in a spanwise direction, an aft tubular section having a forward surface extending in a spanwise direction, and an intermediate tubular section having an aft surface and a forward surface extending in a spanwise direction, the aft surface of the leading edge tubular section abutting and joined to the forward surface of the intermediate tubular section forming the forward wing spar, the forward surface of the aft tubular section abutting and adjoined to the aft surface of the intermediate tubular section forming the mid-wing spar; and connecting the at least three tubular sections to form a unitary body such that the aft surface of the leading edge tubular section defines a forward portion of a front wing spar, the forward surface of the aft tubular section defines an aft portion of a mid-wing spar, the forward surface of the intermediate tubular section defines an aft portion of the front wing spar, and the aft surface of the intermediate tubular section defines a forward portion of the mid-wing spar; wherein the wing structure is a one-piece body that is integrally formed as a single unified structure; and wherein the at least three tubular sections are not attached to a separate non-integral spar structure.

17. The method of claim 16, wherein connecting the at least three tubular sections comprises:

connecting, via a first adhesive bond connection, the aft surface of the leading edge tubular section and the forward surface of the intermediate tubular section, and connecting, via a second adhesive bond connection, the forward surface of the aft tubular section and the aft surface of the intermediate tubular section.

18. The method of claim 16, further comprising, after connecting the at least three tubular sections to form a unitary body, forming an overwrap layer on exterior surfaces of the at least three tubular sections to form an outer shell.

19. The method of claim 18, wherein the overwrap layer comprises a filament wound composite material.

20. The method of claim 19, wherein said filament wound composite material comprises reinforcing fibers selected from the group consisting of carbon fibers, fiberglass, and polymer fibers and the composite material is oriented first in a hoop/chord wise direction.

21. The method of claim 18, wherein forming the overwrap layer on exterior surfaces of the at least three tubular sections comprises wrapping a layer of composite material that is oriented in the hoop/chord direction around the at least three tubular sections, to provide structural connectivity between the adjacent tubular sections.

22. The wing structure of claim 7, wherein the overwrap layer on exterior surfaces of the at least three tubular sections that forms the outer shell comprises a composite material that is oriented in the hoop/chord direction to provide structural connectivity between the adjacent tubular sections.

* * * * *